Jan. 4, 1966             A. ANDY             3,227,200

ANTI-SKID TREAD FOR VEHICLE TIRES

Filed Aug. 12, 1964

INVENTOR.

ANTHONY ANDY

BY

*William J. Ruano* his ATTORNEY

United States Patent Office 3,227,200
Patented Jan. 4, 1966

3,227,200
ANTI-SKID TREAD FOR VEHICLE TIRES
Anthony Andy, Canonsburg, Pa., assignor to Penn Plastic Company, Washington, Pa.
Filed Aug. 12, 1964, Ser. No. 389,036
2 Claims. (Cl. 152—211)

This invention relates to pneumatic vehicle tires and, more particularly, to an anti-skid composition for the tread rubber of such tires.

Various anti-skid particles, such as wood and other fibrous materials, as well as very hard solid materials, have been proposed in the past for improving traction or anti-skid characteristics of vehicle tires. An outstanding disadvantage of such fibrous anti-skid materials is that they absorb moisture, therefore, during the curing or molding process, steam pockets are formed having deleterious effects, such as causing eventual separation of the tread rubber, which is very dangerous when the vehicle is travelling at high speeds. In the use of solid particles, great difficulty has been experienced in anchoring these particles in the tread rubber, since a weak bond is formed between such hard particles and the tread rubber composition.

An object of my invention is to provide a novel anti-skid tread rubber composition for vehicle tires which is devoid of the above-named disadvantages and which will eliminate moisture absorption and weakness of bond between the particles and the tread rubber composition.

A more specific object of my invention is to provide styrene particles in a tread rubber composition for pneumatic vehicle tires, which particles will become firmly bonded to the tread rubber composition and will provide an amazing degree of traction and anti-skid characteristics.

Other objects and advantages of the invention will become more apparent from the following description taken with the accompanying drawing wherein.

Figure 1:
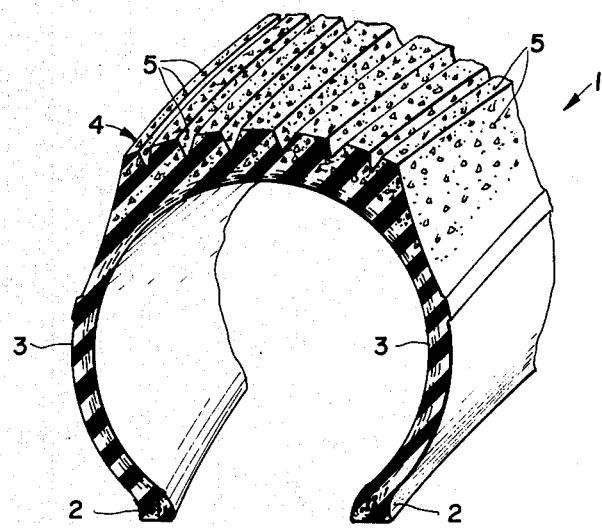
FIG. 1 is a perspective, cross-sectional view of a fragmentary portion of a new vehicle tire embodying anti-skid particles in accordance with the present invention.

Referring more particularly to FIG. 1 of the drawing, numeral 1 generally denotes a fragmentary portion of a pneumatic vehicle tire comprising bead portions 2, sidewalls 3, and a tread rubber portion generally denoted by numeral 4, which tread rubber portion has mixed therein styrene particles 5 for providing anti-skid characteristics. About 10 to 12 pounds by weight of styrene, irregularly shaped particles are mixed with 100 pounds of tread rubber. Such styrene particles are of irregular size in the form of chunks or cubes or scraps having corners and edges and substantially all of which will pass through a ¼ inch mesh screen.

Styrene is selected as an anti-skid material since at milling or molding temperature it will not dissolve into the tread rubber but will become merely distorted in shape as a consequence of softening of the outer surface. This softening creates a very strong bond with the tread rubber and minimizes dropping out of the particles as the outer surface of the tread is worn down thereto. In other words, the core of the styrene particles will remain in their original solid form while the outer surface will fuse to the tread rubber.

Since sytrene particles are non-porous, they will not absorb moisture, and since they do not dissolve at ordinary temperatures encountered for molding, they will retain their hard characteristics and provide very durable particles, serving as anti-skid cleats, having long life because of the amazingly high wearing qualities of styrene.

Figure 2:
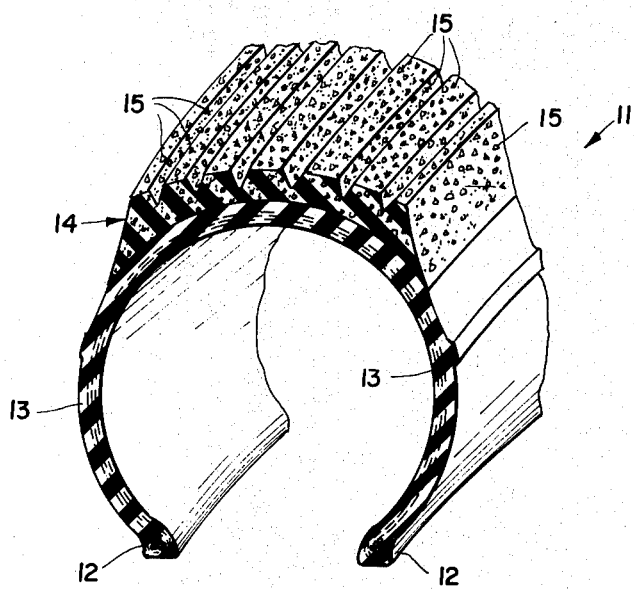
FIG. 2 is a cross-sectional view of a fragmentary portion of a retreaded tire wherein the tread rubber or camelback embodies anti-skid particles in accordance with the present invention.

FIG. 2 shows a modification of the invention in the form of a recapped tire generally denoted by numeral 11 having bead portions 12, sidewall portions 13, and a camelback or recapped tread rubber portion generally denoted by numeral 14, which camelback has a plurality of styrene particles 15 of the shape and composition described above in connection with FIG. 1.

Thus it will be seen that I have provided an efficient anti-skid rubber composition useful for either new tires or recapped tires and comprising anti-skid particles of styrene mixed in a rubber matrix which will retain their very hard core even at molding temperatures, but whose surfaces will soften and become fused or blended with the surrounding tread rubber composition.

While I have illustrated and described several embodiments of my invention, it will be understood that these are by way of illustration only, and that various changes and modifications may be made within the contemplation of my invention and within the scope of the following claims.

I claim:

1. A pneumatic vehicle tire having a tread rubber portion comprising a rubber matrix having substantially uniformly distributed therein throughout the entire depth of the tread, particles of undissolved styrene of irregular shape, having corners and edges, and of a particle size so as to pass through a ¼ inch mesh screen.

2. A vehicle tire as recited in claim 1 wherein said anti-skid particles are in the ratio of about 10 to 12 pounds of styrene to 100 pounds of tread rubber.

References Cited by the Examiner
UNITED STATES PATENTS

| | | | |
|---|---|---|---|
| 2,661,339 | 12/1953 | Sparks et al. | 260—892 |
| 2,675,047 | 4/1954 | Andy | 152—211 |
| 3,115,178 | 12/1963 | Tomarkin | 152—211 |

ARTHUR LA POINT, Primary Examiner.

C. W. HAEFELE, Assistant Examiner.